United States Patent
Koski et al.

(10) Patent No.: US 7,809,893 B2
(45) Date of Patent: Oct. 5, 2010

(54) METHOD AND APPARATUS FOR REFETCHING DATA

(75) Inventors: David Koski, San Jose, CA (US); Ryan R. Klems, Oro Valley, AZ (US)

(73) Assignee: Apple Inc., Cupertino, CA (US)

( * ) Notice: Subject to any disclaimer, the term of this patent is extended or adjusted under 35 U.S.C. 154(b) by 475 days.

(21) Appl. No.: 11/776,948

(22) Filed: Jul. 12, 2007

(65) Prior Publication Data

US 2009/0019227 A1    Jan. 15, 2009

(51) Int. Cl.
*G06F 12/06*    (2006.01)
(52) U.S. Cl. .................. 711/144; 711/145; 711/133
(58) Field of Classification Search .................. 711/113, 711/118, 133, 144, 145
See application file for complete search history.

(56) References Cited

U.S. PATENT DOCUMENTS

| | | | |
|---|---|---|---|
| 5,687,338 A | 11/1997 | Boggs et al. | |
| 6,079,014 A | 6/2000 | Papworth et al. | |
| 6,526,496 B1 | 2/2003 | Hartman et al. | |
| 6,832,338 B2 | 12/2004 | Casper et al. | |
| 6,865,645 B1 | 3/2005 | Shum et al. | |
| 6,877,089 B2 | 4/2005 | Sinharoy | |
| 6,912,650 B2 | 6/2005 | Ukai et al. | |
| 7,409,500 B2 * | 8/2008 | Steely et al. | 711/119 |
| 7,603,705 B2 * | 10/2009 | Roy | 713/189 |
| 2004/0162972 A1 | 8/2004 | Iacobovici et al. | |
| 2007/0174584 A1 | 7/2007 | Kopec et al. | |

* cited by examiner

*Primary Examiner*—Pierre-Michel Bataille (57) ABSTRACT

Methods and apparatus for refetching data to store in a cache are disclosed. According to one aspect of the present invention, a method includes identifying a speculative set that identifies at least a first element that is associated with a cache. The first element has at least a first representation in the cache that is suitable for updating. The method also includes issuing a request to obtain the first element from a data source, opening a channel to the data source, obtaining the first element from the data source using the channel, and closing the channel. Finally, the method includes updating the first representation associated with the first element in the cache.

26 Claims, 7 Drawing Sheets

METHOD AND APPARATUS FOR REFETCHING DATA

BACKGROUND OF THE INVENTION

The present invention relates generally to efficiently providing up-to-date data for use by software applications.

Many applications, such as those which execute on the World Wide Web or provide services, utilize data that is stored on remote sources, e.g., databases or data stores. When an application requires a piece of data stored on a remote source, the application may obtain the piece of data, and then cache the piece data locally for a fixed amount of time. The piece of data may remain cached until the fixed amount of time elapses, at which point the piece of data is generally discarded from the cache.

In general, if a piece of data needed by an application is not available in a cache, the application obtains the piece of data from a remote source in a substantially synchronous manner. That is, when an application requires a piece of data that is not present in a cache, the application requests the piece of data from a remote source, and subsequently retrieves or otherwise receives the piece of data from the remote source. The process of obtaining data from a remote source involves a significant amount of latency and communications overhead, as a connection to the remote source must be opened, and subsequently closed, to enable the piece of data to be obtained. While the amount of time associated with retrieving a single piece of data or a service from the remote source is often on the order of approximately one millisecond, the amount of communications overhead required to open and to close a connection to the remote source is often significantly higher, e.g., on the order of approximately three milliseconds. Hence, there may be approximately four milliseconds associated with retrieving a single piece or data.

As a typical application may require access to multiple pieces of data, e.g., hundreds of pieces of data, the amount of communications overhead and latency associated with obtaining the multiple pieces of data is not insignificant, and may adversely affect the overall performance of the computing system on which the application executes. Therefore, what is desired is a method and an apparatus that improves the speed at which pieces of data that are necessary for the execution of an application may be obtained.

SUMMARY OF THE INVENTION

The present invention relates to proactively updating information stored in a cache by substantially increasing the speed at which data needed for the execution of an application may be obtained. According to one aspect of the present invention, a method includes identifying a speculative set that identifies at least a first element that is associated with a cache. The first element has at least a first representation in the cache that is suitable for updating. The method also includes issuing a request to obtain the first element from a data source, opening a channel to the data source, and obtaining the first element from the data source using the channel. Finally, the method includes updating the first representation associated with the first element in the cache.

In one embodiment, the first element which has a first representation in the cache is suitable for updating if it is a stale representation, an expired representation, a recently accessed representation, or a frequently accessed representation. In another embodiment, the method includes receiving a second request to obtain a second element from the data source, wherein the first request is further arranged to request the second element from the data source.

According to another aspect of the present invention, a system configured to access a data source arrangement that stores at least a first element and a second element includes a memory arrangement, batching logic, and a processor configured to execute the batching logic. The memory arrangement includes a cache arranged to store a plurality of representations including least a first representation. The batching logic is operable to identify the plurality of representations as being suitable for updating, and to initiate a first request to the data source to obtain at least the first element and to update the first representation based on the first element. The first representation is a representation of the first element.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

Typically, fetching or otherwise obtaining information such as a piece of data from a database has a cost that includes significant communications overhead. There is also significant latency, or time associated with waiting for something to occur and not performing any tasks while waiting, associated with an execution path. By way of example, fetching one piece of data from a database may involve approximately three milliseconds of communications overhead in addition to approximately one millisecond associated with actually retrieving the piece of data from the database. Latency, or waiting for something to occur, may be associated with opening and closing a connection to the database over which data may be retrieved, or may be associated with simply waiting for a process to finish executing before performing other tasks.

By enabling more than one piece of data to be fetched when a connection to a database is opened, the overall cost of retrieving each piece of data may be reduced. That is, the cost associated with communications overhead may effectively be optimized. For example, while the cost of fetching a single piece of data using a dedicated connection is approximately N milliseconds, if approximately one hundred pieces of data are obtained using one open connection, the cost of fetching the approximately one hundred pieces of data is significantly less than approximately one hundred times N milliseconds. The cost of fetching approximately one hundred pieces of data using substantially simultaneous requests and a single open connection may be as low as approximately ten times N milliseconds. Hence, in general, M pieces of data may be obtained for significantly less cost than M times N milliseconds. Effectively amortizing communications overhead improves the efficiency with which pieces of data may be obtained.

In an overall system that is capable of obtaining multiple pieces of data in substantially simultaneous requests, e.g., requests that essentially comprise a batch request, the pieces of data to be obtained are identified by monitoring a cache. More specifically, to identify pieces of data to be obtained, a cache in which representations of the pieces of data are stored may be monitored. The identified pieces of data may include those which are in need of updating within the cache, or those which are not in need of updating but are likely to be needed by an application, thread, or service that accesses the cache. That is, the identified pieces of data may include data that is suitable for being refetched, e.g., fetched in anticipation of future use.

Multiple pieces of data may be obtained as a part of a variety of different processes. For example, multiple pieces of data may be fetched as a part of an "automatic batch fetching" process, a "stale data and asynchronous refetching" process, or a "cache warming" process. An automatic batch fetching process may occur when a particular piece of data is required by an application, and the application identifies other data that may be fetched at substantially the same time as the particular piece of data. Typically, an automatic batch fetching process substantially optimizes communications overhead. A stale data and asynchronous refetching process involves fetching data and returning the results of a fetch, and substantially automatically triggering a refetch of stale data to effectively optimize latency. Finally, a cache warming process typically involves periodically checking to see if there is data that is old and/or likely to be used again, and obtaining such data periodically as a part of a batch fetch or refetch. The use of a cache warming process generally removes fetches from the path of execution, and thereby effectively optimizes latency.

It should be appreciated that an automatic batch fetching process, a stale data and asynchronous refetching process, and/or a cache warming process may be combined. By way of example, an automatic batch fetching process may be substantially combined with a stale data and asynchronous refetching process. An automatic batch fetching process may also be combined with a cache warming process, and a stale data and asynchronous refetching process may also be combined with a cache warming process.

Figure 1:
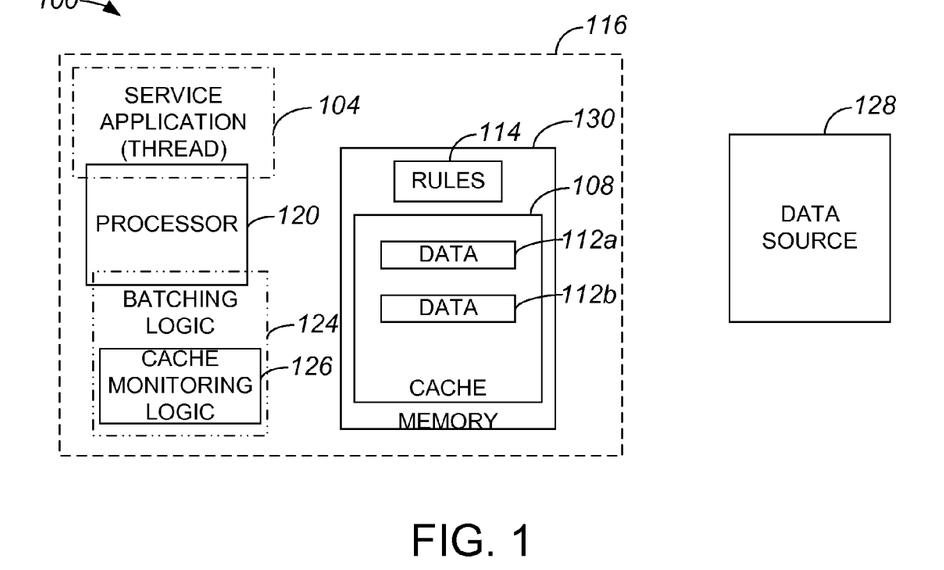
FIG. 1 is a block diagram representation of a system which includes a data cache that may be updated using a batched refetch in accordance with an embodiment of the present invention.

Referring initially to FIG. 1, an overall system in which data may be refetched will be described in accordance with an embodiment of the present invention. An overall system 100, which may be a networked system, includes a client or local computing system 116 and a data source 128. As shown, data source 128 is external to, or otherwise remote to, computing system 116. However, it should be appreciated that data source 128 may also be local with respect to computing system 116, i.e., data source 128 may be a part of computing system 116. Data (not shown) may be stored in tables within data source 128. Data source 128 may generally be any structure which stores data, e.g., a database, and may include a server, e.g., a database server.

Computing system 116 includes a processor 120 and a memory arrangement 130. In one embodiment, computing system 116 may be a distributed system within which processor 120 communicates with memory 130 over a network connection. Processor 120 is arranged to enable a service application 104 or a thread to execute. When executed, service application 104 is configured to access a cache 108. Cache 108 is accessed to obtain representations of data 112a, 112b which correspond to data (not shown) that is stored in data source 128. That is, cache 108 effectively stores copies of data (not shown) associated with data source 128.

When cache 108 does not contain a representation of an appropriate piece of data requested by service application 104, data source 128 may be accessed to obtain the requested piece of data. In the described embodiment, when data source 128 is accessed, in order to reduce the amount of time associated with obtaining data, batching logic 124 may attempt to obtain additional pieces of data along with the requested piece of data as long as a connection (not shown) to data source 128 opened. The additional pieces of data may be obtained as part of a stale data or asynchronous fetch process, or as a part of a cache warming process. The connection (not shown) may be a wired connection or a wireless connection, or may include wired and wireless segments.

Batching logic 124, or a batching application, is arranged to update representations of data 112a, 112b by requesting current versions of the data (not shown) from data source 128. Batching logic 124 includes software and/or hardware logic that, when executed, is operable to obtain multiple pieces of data from data source 128 using a single batched request. The single batched request may effectively include substantially simultaneous requests for the multiple pieces of data. Batching logic 124 includes cache monitoring logic 126 that is configured to monitor cache 108 to determine when data 112a, 112b is stale, expired, recently accessed by application 104, or frequently accessed by application 104. When representations of data 112a, 112b are stale, representations of data 112a, 112b are not expired, but are within a predetermined time interval after a time of expiration, e.g., within a "stale window," and may still be used. A stale window is a time period after which data has expired, but during which a refetch may be triggered. It should be appreciated that representations of data 112a, 112b may not necessarily be stale, but may be within a "refetch" window that is effectively a predetermined time interval before a time of expiration.

Batching logic 124 is configured to identify a speculative set that includes data of interest such as stale and/or expired representations of data 112a, 112b, and to initiate a batch request to data source 128 to fetch data (not shown) that corresponds to stale and/or expired representations of data 112a, 112b included in the speculative set. Such a speculative set may be included in a batch request along with a request for a particular piece of data currently needed by service application 104, or may effectively comprise the entire batch request. In one embodiment, the speculative set also includes old, but not yet expired, data that or data that is likely to be used again.

Batching logic 124 is arranged to apply rules 114 when identifying a speculative set. Rules 114 are generally stored in memory 130 such that memory 130 may access rules 114. Rules 114 or, more specifically, data-fetching rules generally include, but are not limited to including, specifications relating to what information to include in a speculative set and how much information to include in the speculative set.

Figure 2A:
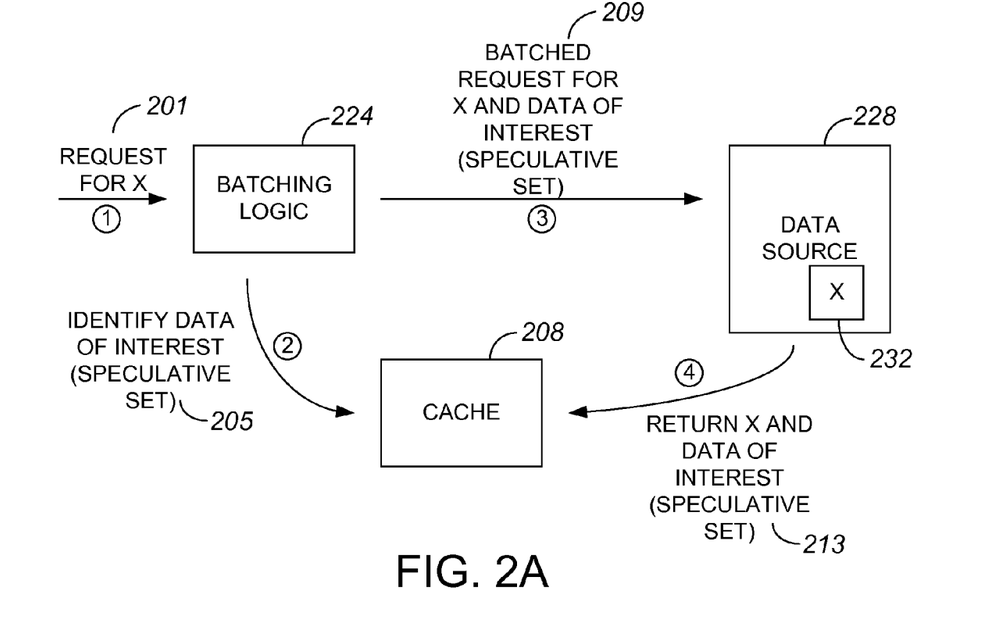
FIG. 2A is a block diagram representation of a process of requesting data that is not present in a cache in accordance with an embodiment of the present invention.

A speculative set that contains data of interest may be processed along with a request for a particular piece of data to effectively amortize the overhead costs associated with opening and closing a connection between a computing system and a data store when the particular piece of data is requested. With reference to FIG. 2A, the processing of a request for a piece of data that is either not currently represented in a cache, or is represented in the cache but is in need of updating, that includes obtaining a speculative set of data will be described in accordance with an embodiment of the present invention. A request 201 for a piece of data 'X' is received by batching logic 224 from a requester, after it has been determined that there is either no representation of data 'X' in a cache 208 or there is a representation of data 'X' in cache 208 that is stale or expired. Upon obtaining request 201, batching logic 224 monitors cache 208 to perform an identification 205 of a speculative set, or data of interest. Data of interest, as mentioned above, may include representations of data in cache 208 that are about to expire or are already expired, as well as representations of data that a requester, e.g., an application or a thread, is likely to subsequently request.

Once data of interest is identified, batching logic 224 issues or sends a batched request 209 to data source 228 that includes a request for data 'X' 232 that is stored in data source 228 and requests for data of interest that is stored in data source 228. In response to batched request 209, data 'X' 232 and data of interest are fetched from data source 228, and returned in a response 213 such that a representation of data 'X' 232 and representations of data of interest may be stored in cache 208.

Figure 2B:
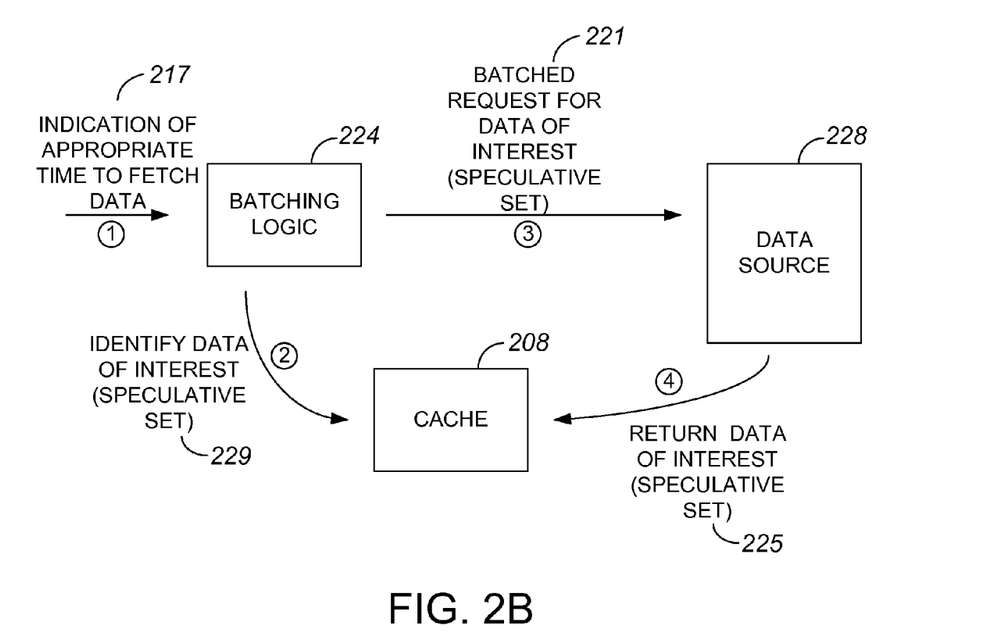
FIG. 2B is a block diagram representation of a process of refetching data at a predetermined time in accordance with an embodiment of the present invention.

As previously mentioned, a speculative set may be processed substantially independently of a request for a particular piece of data. In other words, data that is likely to be subsequently accessed by a thread or application may effectively be refetched such that it is readily available when needed, i.e., data that is likely to be used is fetched in anticipation of a future request for the data. By refetching multiple pieces of data, the overall process of obtaining data may generally occur more efficiently. FIG. 2B is a block diagram representation of a process of refetching data associated with a speculative set at a predetermined time in accordance with an embodiment of the present invention. When data is to be fetched to substantially update the contents of cache 208, as for example as a part of a cache warming process, an indication 217 of an appropriate time to fetch data is received by batching logic 224.

After indication 217 is obtained, batching logic 224 monitors cache 208 to perform an identification 229 of data of interest. Once data of interest is identified, batching logic 224 sends a batched request 221 to data source 228 for data of interest that is stored in data source 228. In response to batched request 221, data of interest is fetched from data source 228 and returned in a response 225 such that representations of data of interest may be stored in cache 208.

Figure 3:
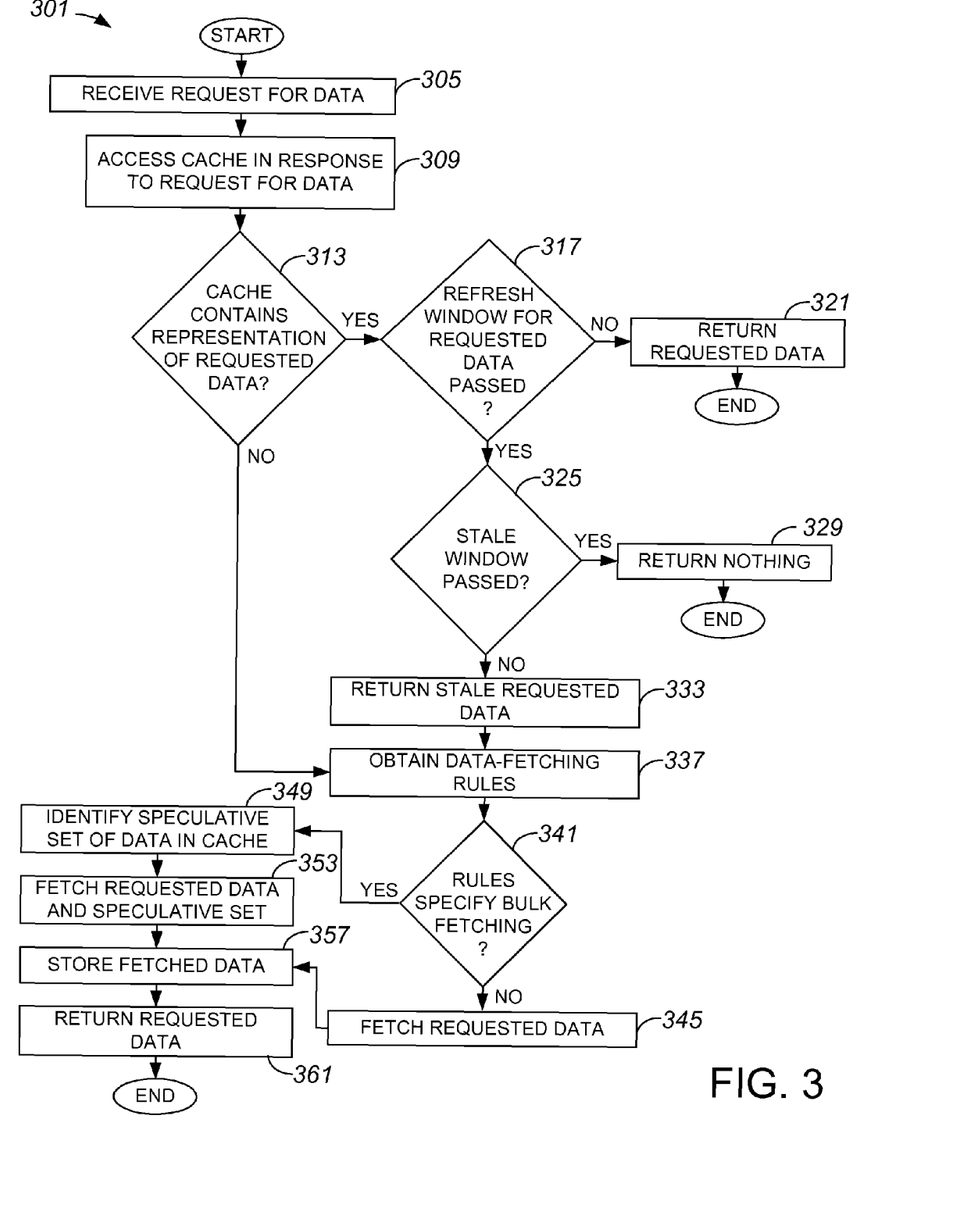
FIG. 3 is a process flow diagram which illustrates a first method of obtaining data in response to a request for a piece of data in accordance with an embodiment of the present invention.

Referring next to FIG. 3, a first process of obtaining data from a cache in response to a request for a piece of data will be described in accordance with an embodiment of the present invention. A process 301 of obtaining data from a cache begins at step 305 in which a request for a particular piece of data is received. In the described embodiment, the request is received by the batching logic executing on a computing system from a thread associated with the computing system. Upon receiving the request for data, the cache is accessed in step 309, e.g., by the batching logic. A determination is then made in step 313 as to whether the cache contains a representation of the requested piece of data. That is, it is determined whether the cache contains an up-to-date version of the requested data or an expired version of the requested data.

If it is determined in step 313 that the cache contains a representation of the requested data, process flow moves to step 317 in which it is determined whether a refresh or stale window for the requested data has passed. A refresh window is a time period during which data is considered to be close to expiring, and effectively not up-to-date. If the refresh window has not passed, then the implication is that the requested data is up-to-date. As such, the requested data is returned in step 321. In other words, the requested data is provided to the requester. After the requested data is returned, the process of obtaining data from a cache is completed.

Alternatively, if it is determined in step 317 that the refresh window for the requested data has passed, then a determination is made in step 325 regarding whether the a stale window has passed. A stale window, as previously mentioned, is a time period after which data has expired, but during which data is still usable and a refetch may be triggered. In the described embodiment, a refetch is not triggered if the stale window has passed. If the determination is that the stale window has passed, then nothing is returned to the requester in step 329, and the process of obtaining data is terminated. It should be appreciated, however, that in lieu of returning nothing, an error message or an indication that the requested data has expired may instead be returned.

If the determination in step 325 is that the stale window has not passed, the indication is that while the requested data is stale, a refetch may be triggered. Accordingly, in step 333, the stale requested data is returned to the requester. Once the requested data is returned, data-fetching rules are obtained in step 337. The data-fetching rules may be obtained from a memory of the computing system. The data-fetching rules generally specify whether substantially only the stale requested data is to be fetched from a data source in order to update the cache, or whether other data associated with the cache is also to be fetched from the data source.

A determination is made in step 341 regarding whether the data-fetching rules specify obtaining data in addition to the requested data. In other words, it is determined in step 341 whether the data-fetching rules specify bulk fetching. If the determination is that bulk fetching is specified, process flow moves to step 349 in which a speculative set of data is identified in the cache. The speculative set may include, but is not limited to including, data in the cache that is stale, expired, frequently accessed, or recently accessed. The speculative set may also identify data that is ascertained as being relatively important to the thread which initiated the request. In one embodiment, a specification of a minimum amount of data and/or a maximum amount of data to include in the speculative set may be provided, as for example in the data-fetching rules. A determination of whether a piece of data is considered as being relatively important may include, but is not limited to including, identifying a number of times the piece of data was touched or accessed, and identifying how recently the piece of data was touched or accessed. In one embodiment, the speculative set may also include data that is not in the cache but is likely to be needed by the thread which initiated the request for the requested data. In general, the number of pieces of data in a speculative set may vary depending upon the requirements of the computing system.

After the speculative set is identified, the requested data piece and the speculative set are fetched from a data source in step 353. The fetched requested data piece and the data included in the fetched speculative set are stored in the cache in step 357. Then, in step 361, the requested data is returned or otherwise provided to a requester, and the process of obtaining data from a cache is completed. Referring back to step 341, if the determination is that the rules do not specify bulk fetching, then the implication is that substantially only the requested data is to be fetched from a data source. As such, in step 345, the requested data is fetched. Once the requested data is fetched, the fetched requested data is stored in the cache in step 357.

Returning back to step 313 and the determination of whether the cache contains a representation of the requested data, if it is determined that there is no representation of the requested data in the cache, then the indication is that the data is to be retrieved from a data source. Hence, process flow moves from step 313 to step 337 in which data-fetching rules are obtained.

Figure 4:
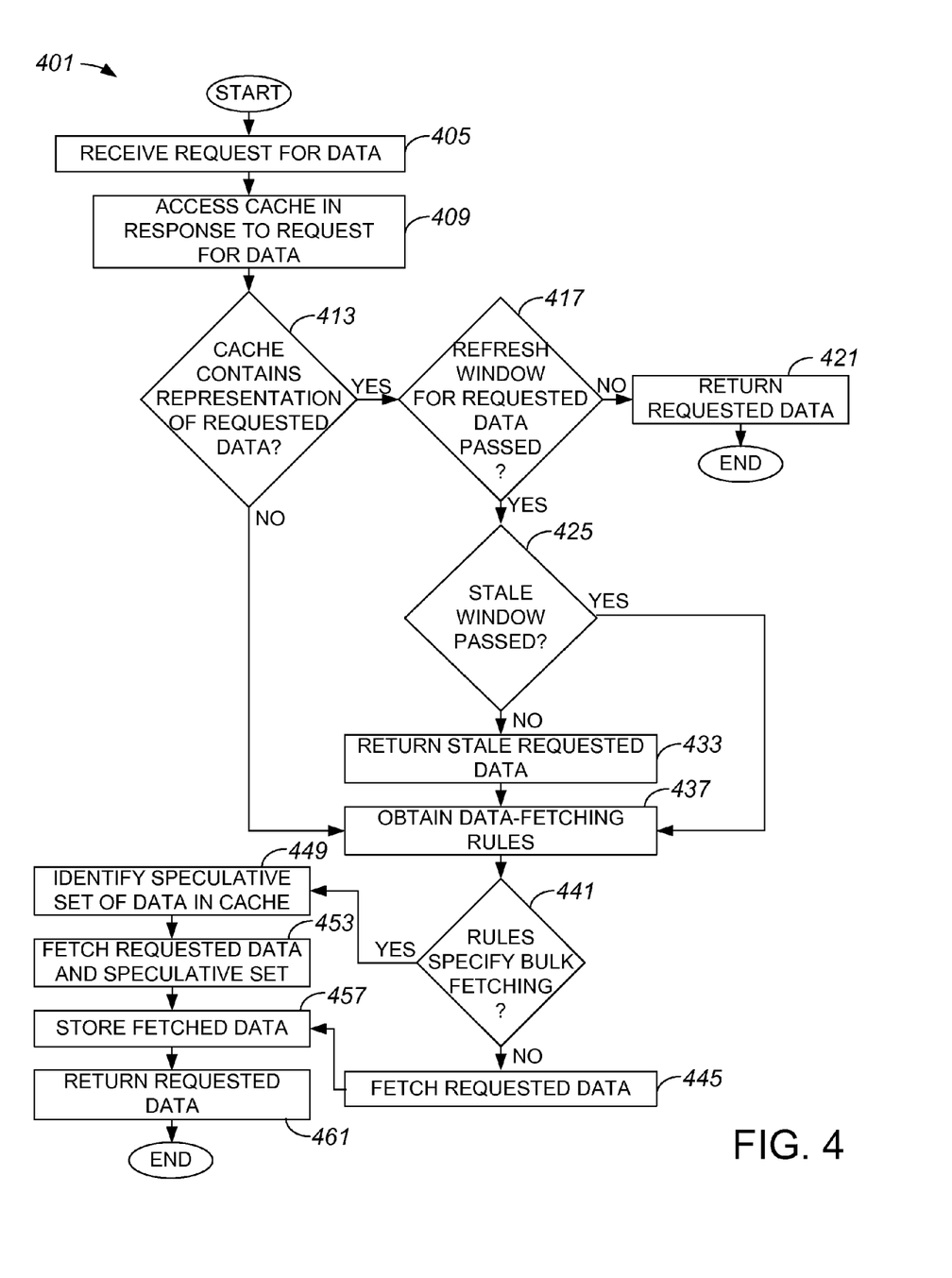
FIG. 4 is a process flow diagram which illustrates a second method of obtaining data in response to a request for a piece of data in accordance with an embodiment of the present invention.

As described with respect to FIG. 3, if requested data is represented in a cache but is expired, nothing is returned to a requester and the requested data is not fetched. In one embodiment, however, if requested data is represented in a cache but is expired, the requested data is fetched from a data store and then returned to the requester. FIG. 4 is a process flow diagram which illustrates a method of obtaining data in response to a request for a piece of data that includes fetching the requested piece of data from a data source if a representation of the requested piece of data in the cache is old or expired in accordance with an embodiment of the present invention. A process 401 of obtaining data from a cache begins at step 405 in which a request for a particular piece of data is received, as for example from a thread. After receiving the request for data, the cache is accessed in step 409, and a determination is made in step 413 as to whether the cache contains a representation of the requested piece of data.

If it is determined in step 413 that the cache contains a representation of the requested data, process flow moves to step 417 in which it is determined whether a refresh window for the requested data has passed. If the refresh window has not passed, then the implication is that the requested data is up-to-date, and the requested data is returned in step 421, e.g., to the requester. After the requested data is returned, the process of obtaining data from a cache is completed.

Alternatively, if it is determined in step 417 that the refresh window for the requested data has passed, then a determination is made in step 425 regarding whether the stale window has passed. If the determination in step 425 is that the stale window has not expired, the indication is that the requested data is stale, but that a refetch may be triggered. Accordingly, in step 433, the stale requested data is returned to the requester. Once the requested data is returned, data-fetching rules are obtained in step 437, as for example from a memory of the computing system.

It is determined in step 441 whether the data-fetching rules specify obtaining data in addition to the requested data. That is, it is determined in step 441 whether the data-fetching rules specify bulk fetching. If the determination is that bulk fetching is specified, process flow moves to step 449 in which a speculative set of data is identified in the cache. After the speculative set is identified, the requested data piece and the speculative set are fetched from a data source in step 453. The fetched requested data piece and the data included in the fetched speculative set are stored in the cache in step 457. Then, in step 461, the requested data is returned or otherwise provided to a requester, and the process of obtaining data from a cache is completed. Referring back to step 441, if the determination is that the rules do not specify bulk fetching, then the implication is that substantially only the requested data is to be fetched from a data source. As such, in step 445, the requested data is fetched. Once the requested data is fetched, the fetched requested data is stored in the cache in step 457.

Returning to step 425 and the determination of whether the stale window has passed, if it is determined that the stale window has passed, then data-fetching rules are obtained in step 437. Referring back to step 413 and the determination of whether the cache contains a representation of the requested data, if it is determined that there is no representation of the requested data in the cache, then the indication is that the data is to be retrieved from a data source. Hence, process flow moves from step 413 to step 437 in which data-fetching rules are obtained.

Figure 5:
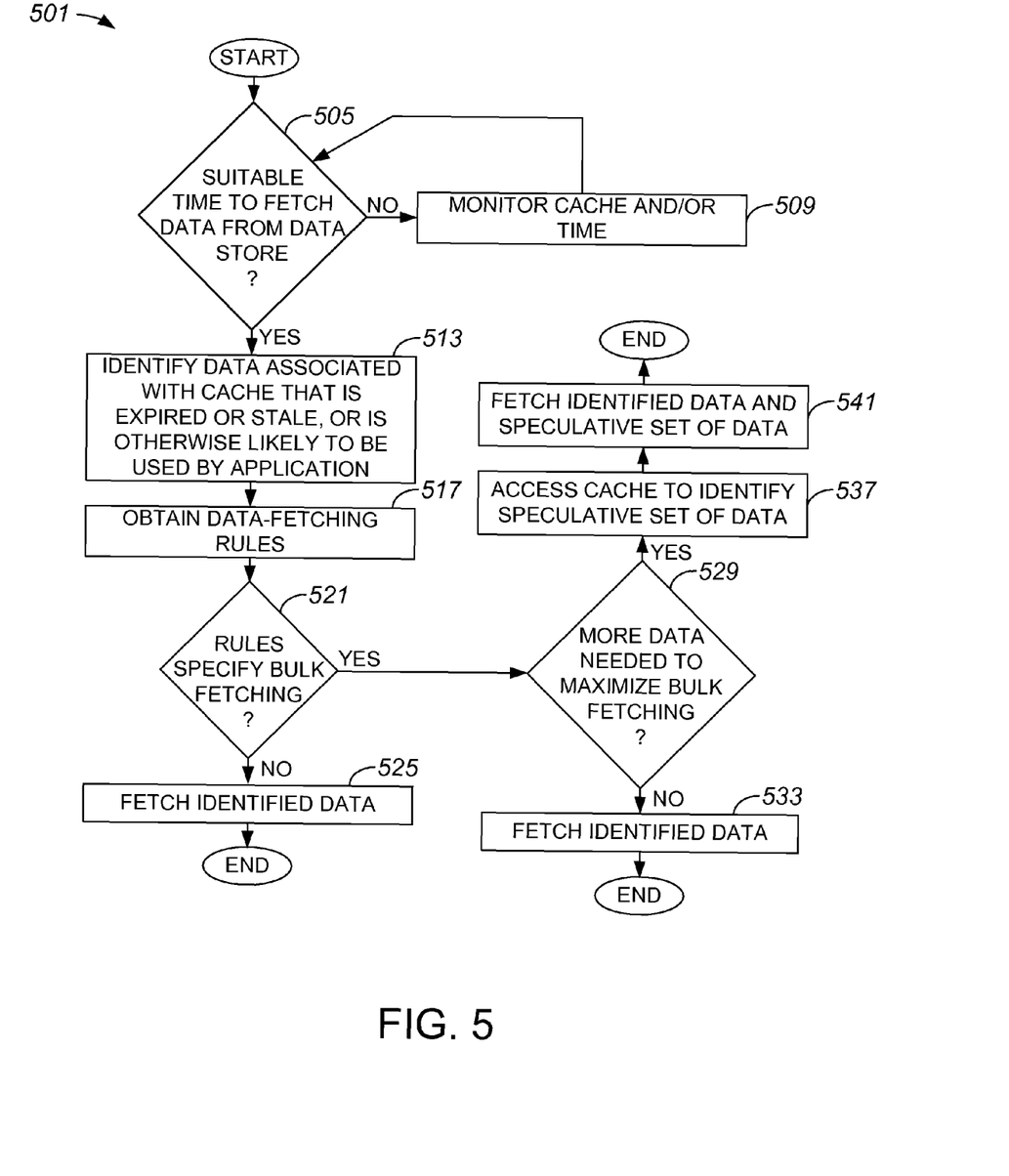
FIG. 5 is a process flow diagram which illustrates a method of refetching data for a cache in accordance with an embodiment of the present invention.

Old or expired data that is stored in a cache is not limited to being refreshed when there is a request for a particular piece of data that is old or expired. In other words, data stored in a cache may effectively be asynchronously fetched substantially independently of any request for data that necessitates access to an external data store. For example, data may be refetched as a part of a cache warming process at predetermined intervals such that it may be ensured that data that is likely to be accessed, and is either expired or about to become expired, may be refreshed. FIG. 5 is a process flow diagram which illustrates a method of refetching data for a cache in accordance with an embodiment of the present invention. A process 501 of refetching data using a batch request begins at step 505 in which it is determined if the current time is an appropriate time to fetch data from a data store to refresh entries in a cache. The determination of whether it is a suitable time to fetch data from a data store may be made by batching logic executing on a computing system, and may be based on a variety of different factors. For instance, an appropriate time may be based on a predetermined interval, e.g., data is fetched from a data store approximately every sixty seconds. An appropriate time may also be determined based upon an amount of time that has elapsed since the last time data was fetched from a data store, regardless of whether the data was last fetched as a result of a particular data request or as part of a previous refetch. In one embodiment, an appropriate time to fetch data may be when a cache monitor ascertains that a threshold number of stale or expired entries are present within the cache.

If it is determined that the current time is not a suitable time to fetch data from a data store in order to refresh a cache, the cache and/or the time is monitored in step 509. Process flow then returns to step 505 and the determination of whether the current time is a suitable time to fetch data from a data store.

If the determination in step 505 is that the current time is a suitable time to fetch data from a data store, data represented in a cache is identified in step 513. The data that is identified may be expired, stale, or otherwise likely to be used by a thread or application. It should be appreciated that data that is likely to be used may be identified by searching the cache, or by studying a thread or application. Once data is identified, data-fetching rules are obtained in step 517.

After data-fetching rules are obtained, if is determined in step 521 whether the data-fetching rules specify bulk fetching. If it is determined that the data-fetching rules do not specify bulk fetching, the identified data is fetched in step 525, and the process of refetching data is completed. Alternatively, if it is determined in step 521 that the data-fetching rules specify bulk fetching, process flow moves to step 529 in which it is determined if more data should be fetched to substantially maximize bulk fetching. In other words, it is determined in step 529 whether the identified data meets bulk fetching requirements, or whether additional data should be obtained to meet bulk-fetching specifications. Such a determination may be made though comparing the amount of identified data with amounts specified in the data-fetching rules.

If the determination in step 529 is that no more data is needed to substantially maximize bulk fetching, the identified data is fetched in step 533, and the process of refetching data is completed. On the other hand, if it is determined in step 529 that additional data should be fetched in order to substantially maximize bulk fetching, the cache is accessed in step 537 to identify a speculative set of data. In the described embodiment, the speculative set of data may include data that is relatively fresh, as data that is expired or stale is generally accounted for in the data identified in step 513. Once the speculative set of data is identified, the identified data and the speculative set of data are fetched in step 541, and the process of refetching data is completed.

Figure 6:
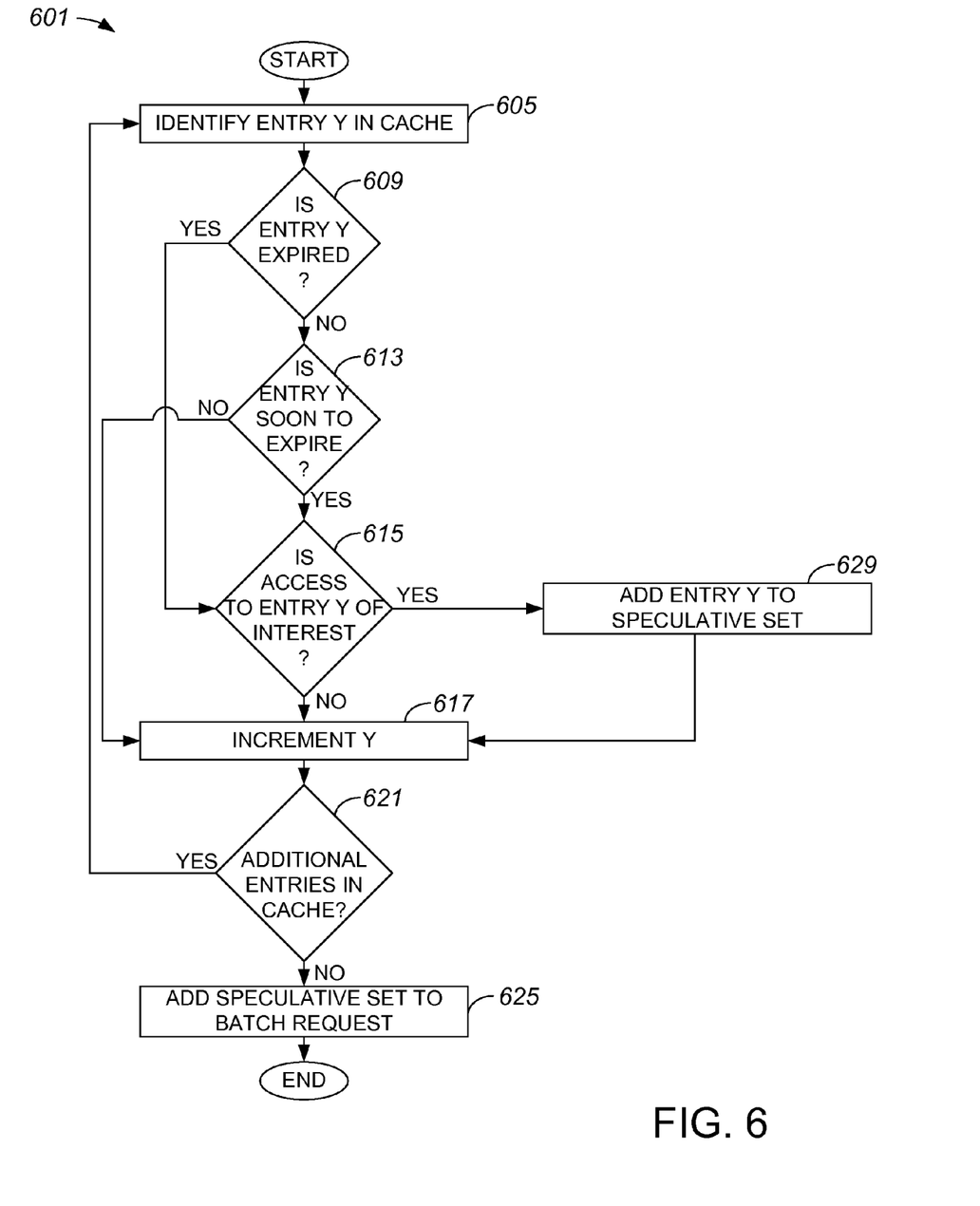
FIG. 6 is a process flow diagram which illustrates a method of building a batch request in accordance with an embodiment of the present invention.

In general, as described above, a speculative set of data that is specified in a batch request may include old entries, e.g., entries that are expired or about to expire, in a cache. With reference to FIG. 6, a method of building a batch request that specifies a speculative set will be described in accordance with an embodiment of the present invention. A process 601 of building a batch request begins at step 605 in which entry 'Y' in a cache is identified, as for example by batching logic executing on a computing system. A determination is made in step 609 regarding whether entry 'Y' is expired. If it is determined that entry 'Y' is expired, it is determined in step 615 whether access to entry 'Y' is potentially of interest. A determination of whether access to entry 'Y' is of interest may include, but is not limited to including, ascertaining whether entry 'Y' was relatively recently accessed and/or whether entry 'Y' is relatively frequently accessed. If it is determined that access to entry 'Y' is of interest, entry 'Y' is added to a speculative set in step 629.

After entry 'Y' is added to the speculative set, 'Y' is incremented in step 617, and it is then determined in step 621 whether there are additional entries in the cache. If it is determined that there are additional entries in the cache, process flow returns to step 605 in which entry 'Y' is identified in the cache. Alternatively, if it is determined in step 621 that there are no additional entries in the cases, the indication is that the speculative set is completed, i.e., all entries that are suitable for inclusion in the speculative set have been included. As such, the speculative set is added to a batch request in step 625, and the process of building a batch request is completed. It should be appreciated that if the batch request is being built in response to a request for a particular piece of data, the particular piece of data is also included in the batch request.

Returning to step 609, if the determination is that entry 'Y' is not expired, it is then determined in step 613 if entry 'Y' is soon to expire. That is, it is determined in step 613 whether entry 'Y' is near its expiration time. If it is determined that entry 'Y' is soon to expire, then process flow proceeds to step 615 in which it is determined whether access to entry 'Y' is of interest. Alternatively, if it is determined that entry 'Y' is not about to expire, the indication is that entry 'Y' is fresh, current, or otherwise up-to-date. As such, process flow proceeds to step 617 in which 'Y' is incremented.

Figure 7:
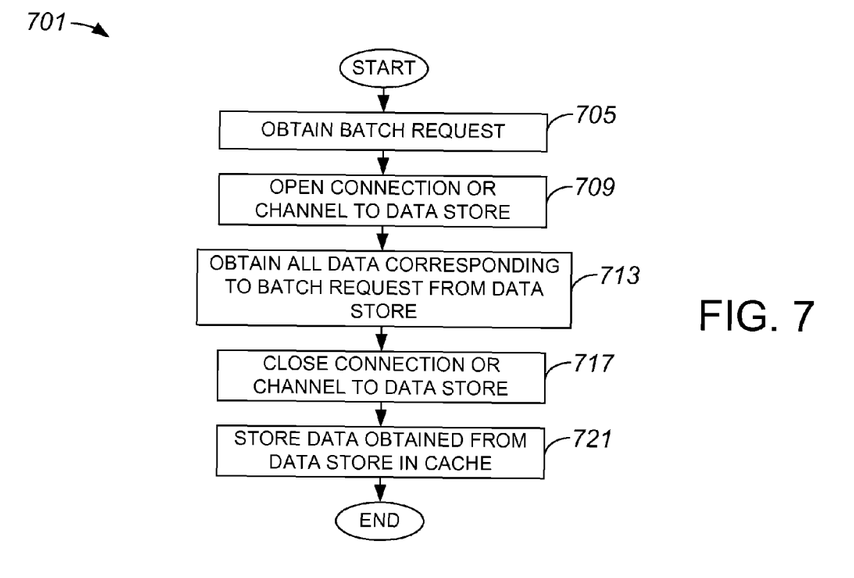
FIG. 7 is a process flow diagram which illustrates a method of obtaining data from a data store using a batch request in accordance with an embodiment of the present invention.

Once a batch request is created, the batch request may be processed. Processing a batch request typically involves accessing a data source, and obtaining data to be stored into a cache. FIG. 7 is a process flow diagram which illustrates a method of processing a batch request in accordance with an embodiment of the present invention. A process 701 of processing a batch request begins at step 705 in which a batch request is obtained. The batch request may be obtained by batching logic from within batching logic, or by batching logic from a thread. After the batch request is obtained, a connection or channel to a data store from which data is to be obtained is opened in step 709. The connection may generally be a wired connection or a wireless connection.

In step 713, substantially all data corresponding to the batch request is obtained from the data store. Obtaining the data may include sending a request for the data on the connection to the data source, and receiving a response that includes the data on the connection from the data source. As the multiple pieces of data may be requested and received on a single open connection, the overhead associated with opening a new connection for each request for a piece of data may be substantially avoided. That is, the overhead associated with opening and closing a single connection to a data store may effectively be applied to obtaining multiple pieces of data.

Upon obtaining substantially all data corresponding to a batch request, the connection over which the data was obtained is closed in step 717. Then, in step 721, the data obtained from the data store is stored in an appropriate cache, and the processing of a batch request is completed.

Figure 8:
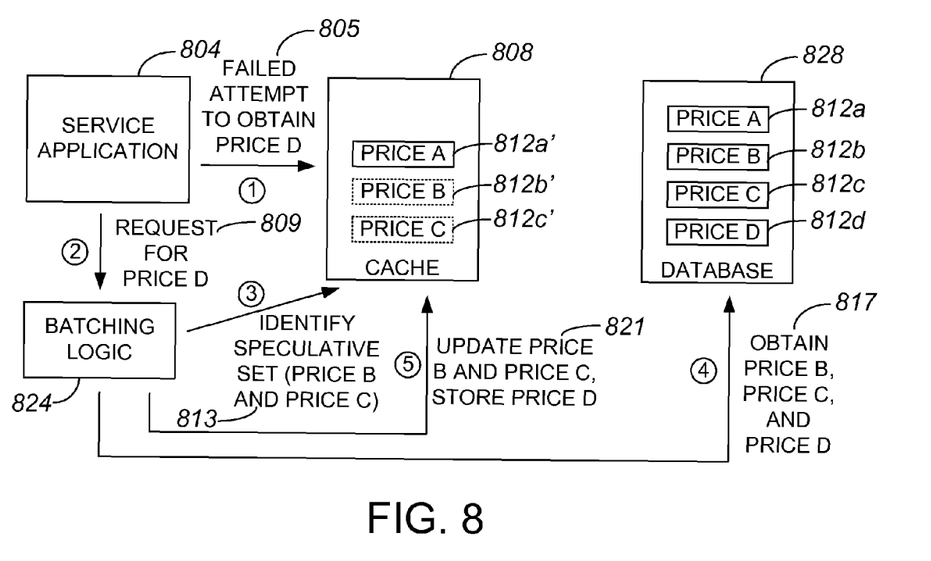
FIG. 8 is a block diagram representation of a process of updating prices stored in a cache by refetching prices in accordance with an embodiment of the present invention.

Data that is stored in a cache may generally be refetched for use with substantially any suitable thread, application, or service. That is, a method for refetching data from a data store may be implemented with respect to a variety of systems. In one embodiment, a batched request for data that involves refetching data based on a speculative set may be applied to an application in which current prices are cached. FIG. 8 is a block diagram representation of a process of updating prices stored in a cache by refetching prices in accordance with an embodiment of the present invention. A service application 804 may be arranged to utilize discrete pieces of data such as prices 812*a-d* that are stored on a database 828 that is remote with respect to service application 804. Service application 804 caches representations 812*a*'-*c*' of prices 812*a-c*, respectively, for a fixed amount of time. When service application 804 performs a unit of work, e.g., when service application 804 draws a web or browser page, service application 804 may attempt to obtain a representation of price 'D' 812*d* from cache 808. As there is no representation of price 'D' 812*d* in cache 808, service application 804 has effectively made a failed attempt 805 to obtain price 'D' 812*d*.

Because of failed attempt 805 to obtain price 'D' 812*d* or, more specifically, a representation of price 'D' in cache 808, service application 804 may access batching logic 824 with a request 809 for price D 817. Upon receiving request 809, batching logic 824 prepares to access database 828 to obtain price 'D' 812*d*. In preparation for accessing database 828, batching logic 824 accesses cache 808 to identify representations 812*a*'-*c*' of prices 812*a-c* which may be out-of-date, e.g., expired or stale. That is, batching logic 824 performs and identification 813 of a speculative set 813 of prices which, in the described embodiment, are representations 812*b*', 812*c*' that are suitable for being updated.

After batching logic 824 identifies speculative set 813, batching logic 824 makes a request 817 for prices 812*b-d* to database 828, and obtains prices 812*b-d*. Once batching logic 824 obtains prices 812*b-d*, batching logic 824 performs an update 821 on cache 808, i.e., batching logic 824 updates representations 812*b*', 812*c*' and adds a representation of price 'D' 812*d* into cache 808.

Although only a few embodiments of the present invention have been described, it should be understood that the present invention may be embodied in many other specific forms without departing from the spirit or the scope of the present invention. By way of example, the number of pieces of data included in a speculative set may vary widely. In general, the determination of how many pieces of data to include in a speculative set may depend upon factors including, but not limited to, performance requirements of a computing system.

While retrieving data from a data source has generally been described, the present invention is not limited to retrieving data. For instance, rather than retrieving data from a data source, other elements may instead be retrieved from a data source. Such elements may include, but are not limited to, services.

In one embodiment, data that is stored in a cache may be obtained from more than one data store. If data is obtained from more than one data store, a separate speculative set may be formed for each data store such that each speculative set is associated with data from a particular data store. Hence, when a request for a particular piece of data is processed, data contained in the speculative set associated with the data store in which the particular piece of data is contained may be obtained as a part of a batch request.

The steps associated with the methods of the present invention may vary widely. Steps may be added, removed, altered, combined, and reordered without departing from the spirit of the scope of the present invention. For example, when creating a speculative set, there may be a substantially maximum number of entries that may be included in the speculative set. As such, a method for creating a speculative set that may include 'Z' entries may involve identifying the 'Z' stalest and expired entries, and may not include substantially all entries that are within either a refresh window or a stale window. Therefore, the present examples are to be considered as illustrative and not restrictive, and the invention is not to be limited to the details given herein, but may be modified within the scope of the appended claims.

What is claimed is:

1. A method performed by a computing system having at least a processor and cache memory, the method comprising:
    identifying a speculative set using at least the processor of the computing system, the speculative set being arranged to identify at least a first element that is associated with the cache memory, wherein the at least first element has at least a first representation in the cache memory that is suitable for updating;
    issuing a first request, the first request being arranged to request the at least first element identified in the speculative set from a data source;
    opening a channel to the data source;
    obtaining the at least first element identified in the speculative set from the data source via the channel; and
    updating the at least first representation associated with the at least first element identified in the speculative set in the cache memory.

2. The method of claim 1 wherein the at least first element which has the at least first representation in the cache memory that is suitable for updating is one selected from the group including a stale representation, an expired representation, a recently accessed representation, and a frequently accessed representation.

3. The method of claim 1 further including:
    receiving a second request to obtain a second element from the data source, wherein the first request is further arranged to request the second element from the data source.

4. The method of claim 3 further including obtaining the second element from the data source using the channel and updating a second representation associated with the second element in the cache memory.

5. The method of claim 3 wherein the second request is received from a requestor, and the method further includes:
    providing the second element to the requestor.

6. The method of claim 5 wherein the requestor is one selected from the group including a service, an application, and a thread.

7. The method of claim 1 further including:
    monitoring the cache memory to determine when to issue the first request, wherein identifying the speculative set includes identifying the speculative set when it is determined that the first request is to be issued.

8. The method of claim 1 further including:
    specifying a number of elements to include in the speculative set.

9. The method of claim 1 wherein the first request is a bulk request, the bulk request being arranged to request the at least first element and other elements identified in the speculative set.

10. A method for updating contents of a cache device providing data storage, the method comprising:
    identifying a plurality of representations stored in the cache device, the plurality of representations being suitable for updating, wherein each representation of the plurality of representations has an associated element stored in a data store arrangement;
    opening a communications channel to the data store arrangement;
    substantially simultaneously retrieving the associated element for each representation of the plurality of representations from the data store arrangement; and
    updating each representation of the plurality of representations stored in the cache device using the retrieved associated element for each representation of the plurality of representations.

11. The method of claim 10 further including:
    receiving a request to obtain a first element from the data source;
    identifying the plurality of representations after receiving the request; and
    substantially simultaneously retrieving the first element along with the associated element for each representation of the plurality of representations from the data store arrangement.

12. An apparatus comprising:
    means for identifying a speculative set, the speculative set being arranged to identify at least a first element that is associated with a cache, wherein the at least first element has at least a first representation in the cache that is suitable for updating;
    means for issuing a first request, the first request being arranged to request the at least first element identified in the speculative set from a data source; means for opening a channel to the data source;
    means for obtaining the at least first element identified in the speculative set from the data source using the channel; and
    means for updating the at least first representation associated with the at least first element identified in the speculative set in the cache.

13. A system, the system being arranged to access a data source arrangement, the data source arrangement being configured to store at least a first element and a second element, the system comprising:

a memory arrangement, the memory arrangement including a cache, wherein the cache is configured to store a plurality of representations including least a first representation;

batching logic, the batching logic being operable to identify the plurality of representations as being suitable for updating, the batching logic further being arranged to initiate a first request to the data source to obtain at least the first element and to update the first representation based on the first element, wherein the first representation represents the first element; and a processor configured to execute the batching logic wherein the batching logic is further operable to obtain a second request to retrieve the second element from the data source, and to include the second request in the first request to the data source; and wherein the batching logic is configured to cause a channel to be opened to the data source over which the first element and the second element are obtained.

14. The system of claim 13 wherein the batching logic includes cache monitoring logic arranged to monitor the cache to determine when to initiate the first request to the data source.

15. The system of claim 13 wherein the batching logic identifies the plurality of representation as being suitable for updating after the second request is obtained.

16. The system of claim 13 wherein the plurality of representations that are suitable for updating include representations selected from the group including a stale representation, an expired representation, a recently accessed representation, and a frequently accessed representation.

17. The system of claim 13 wherein the first request is initiated to obtain a plurality of elements stored in the data source arrangement including the first element.

18. Logic encoded in one or more tangible media for execution and when executed operable to:

identify a speculative set, the speculative set being arranged to identify at least a first element that is associated with a cache, wherein the at least first element has at least a first representation in the cache that is suitable for updating;

issue a first request, the first request being arranged to request the at least first element identified in the speculative set from a data source;

open a channel to the data source;

obtain the at least first element identified in the speculative set from the data source using the channel; and update the at least first representation associated with the at least first element identified in the speculative set in the cache.

19. The logic of claim 18 wherein the at least first element which has the at least first representation in the cache that is suitable for updating is one selected from the group including a stale representation, an expired representation, a recently accessed representation, and a frequently accessed representation.

20. The logic of claim 18 further operable to:
receive a second request to obtain a second element from the data source, wherein the first request is further arranged to request the second element from the data source.

21. The logic of claim 20 further operable to obtain the second element from the data source using the channel and to update a second representation associated with the second element in the cache.

22. The logic of claim 20 wherein the second request is received from a requestor, and the logic is further operable to provide the second element to the requestor.

23. The logic of claim 22 wherein the requestor is one selected from the group including a service, an application, and a thread.

24. The logic of claim 18 further operable to:
monitor the cache to determine when to issue the first request; and
identify the speculative set when it is determined that the first request is to be issued.

25. The logic of claim 18 further operable to:
specify a number of elements to include in the speculative set.

26. Logic encoded in one or more tangible media for execution and when executed operable to:
identify a plurality of representations stored in a cache, the plurality of representations being suitable for updating, wherein each representation of the plurality of representations has an associated element stored in a data store arrangement;
open a communications channel to the data store arrangement;
substantially simultaneously retrieve the associated element for each representation of the plurality of representations from the data store arrangement; and
update each representation of the plurality of representations in the cache using the retrieved associated element for each representation of the plurality of representations.

* * * * *

UNITED STATES PATENT AND TRADEMARK OFFICE
CERTIFICATE OF CORRECTION

| | | |
|---|---|---|
| PATENT NO. | : 7,809,893 B2 | Page 1 of 1 |
| APPLICATION NO. | : 11/776948 | |
| DATED | : October 5, 2010 | |
| INVENTOR(S) | : David Koski et al. | |

It is certified that error appears in the above-identified patent and that said Letters Patent is hereby corrected as shown below:

In column 12, lines 48-63, in claim 12, delete "An apparatus comprising:
means for identifying a speculative set, the speculative set being arranged to identify at least a first element that is associated with a cache, wherein the at least first element has at least a first representation in the cache that is suitable for updating;
means for issuing a first request, the first request being arranged to request the at least first element identified in the speculative set from a data source; means for opening a channel to the data source;
means for obtaining the at least first element identified in the speculative set from the data source using the channel; and
means for updating the at least first representation associated with the at least first element identified in the speculative set in the cache."
and insert -- An apparatus comprising:
means for identifying a speculative set, the speculative set being arranged to identify at least a first element that is associated with a cache, wherein the at least first element has at least a first representation in the cache that is suitable for updating;
means for issuing a first request, the first request being arranged to request the at least first element identified in the speculative set from a data source;
means for opening a channel to the data source;
means for obtaining the at least first element identified in the speculative set from the data source using the channel; and
means for updating the at least first representation associated with the at least first element identified in the speculative set in the cache. --, therefor.

In column 13, line 3, in claim 13, delete "least" and insert -- at least --, therefor.

Signed and Sealed this
Twenty-second Day of November, 2011

David J. Kappos
*Director of the United States Patent and Trademark Office*